(12) United States Patent
Iwamoto et al.

(10) Patent No.: US 6,838,794 B2
(45) Date of Patent: Jan. 4, 2005

(54) BEARING ASSEMBLY WITH ELECTRIC POWER GENERATOR

(75) Inventors: Kenichi Iwamoto, Iwata (JP); Koichi Okada, Iwata (JP); Hiroaki Ohba, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 10/377,755

(22) Filed: Mar. 4, 2003

(65) Prior Publication Data

US 2003/0173844 A1 Sep. 18, 2003

(30) Foreign Application Priority Data

Mar. 14, 2002 (JP) .......................................... 2002-070086

(51) Int. Cl.[7] .............................................. H02K 5/16
(52) U.S. Cl. .......................................... 310/90; 310/168
(58) Field of Search .......................... 310/90, 168, 171; 384/488

(56) References Cited

U.S. PATENT DOCUMENTS

| 4,688,951 | A | * | 8/1987 | Guers .......................... 384/446 |
|---|---|---|---|---|
| 4,695,419 | A | * | 9/1987 | Inariba ........................ 264/259 |
| 5,440,184 | A | * | 8/1995 | Samy et al. .................. 310/90 |
| 6,229,298 | B1 | * | 5/2001 | Sakamoto et al. .......... 324/174 |
| 6,398,395 | B1 | * | 6/2002 | Hyun .......................... 362/500 |
| 6,585,420 | B2 | * | 7/2003 | Okada et al. ............... 384/448 |

* cited by examiner

*Primary Examiner*—Dang Le
*Assistant Examiner*—Nguyen Hanh (57) ABSTRACT

To provide a bearing assembly having an electric power generating capability, that can be assembled compact in size and easily incorporated in a drive transmission system of an internal combustion engine, the bearing assembly having an electric power generating capability includes a rolling bearing 1 including an outer race 7 and an inner race 6 rotatable relative to the outer race 7, and an electric power generator 2 interposed between the inner and outer races 6 and 7 for generating an electric power by a rotation of the inner race 6 relative to the outer race 7. This bearing assembly may be used as a bearing in the drive transmission system of the internal combustion engine for rotatably supporting, for example, a crankshaft 4.

7 Claims, 6 Drawing Sheets

BEARING ASSEMBLY WITH ELECTRIC POWER GENERATOR

BACKGROUND OF THE INVENTION

1. Field of the Invention

The present invention generally relates to a bearing assembly for use in a drive transmission system of a general-purpose internal combustion engine and, more particularly, to the bearing assembly having a capability of generating an electric power.

2. Description of the Prior Art

A general-purpose internal combustion engine generally makes use of an electric power generator for providing an electric power source for various loads. This electric power generator is generally supported in the vicinity of a crankshaft by means of a support member separate from bearing assemblies for the support of the crankshaft.

It has, however, been found that in the configuration in which the electric power generator is mounted separate from the bearing assembly, assemblage tends to be complicated and often results in a bulky size. Because of this, in some small-size machines and equipments that are powered by an internal combustion engine, such as, lawn mowers, harvesters and croppers, the power generator is not utilized and, accordingly, difficulty has often been encountered with availability of an electric power.

SUMMARY OF THE INVENTION

In view of the foregoing, the present invention is intended to provide a bearing assembly having an electric power generating capability, that can be assembled compact in size and easily incorporated in a drive transmission system of an internal combustion engine.

In order to accomplish the foregoing object of the present invention, a bearing assembly having an electric power generating capability is provided which includes a rolling bearing adapted to be disposed in a drive transmission system of an internal combustion engine and having a non-rotatable raceway member and a rotatable raceway member rotatable relative to the non-rotatable raceway, and an electric power generator interposed between the non-rotatable and rotatable raceway members for generating an electric power by a rotation of the rotatable raceway member relative to the non-rotatable raceway member.

According to the present invention, since the electric power generator is integrated together with the rolling bearing, assemblage can advantageously be improved as compared with the separate disposition of the bearing and the electric power generator. Also, considering that the electric power generator is incorporated in the rolling bearing, the assembly as a whole can be manufactured compact in size.

The bearing assembly having the electric power generating capability according to the present invention may be used concurrently for the support of the crankshaft of the internal combustion engine. The use of the bearing assembly of the present invention for the support of the crankshaft makes it possible to integrate the support bearing and the electric power generator together, resulting in saving of the limited peripheral space in the internal combustion engine.

The electric power generator employed in the bearing assembly in accordance with the present invention may be used concurrently for detecting the number of revolutions and also for providing the electric power. By extracting a rotation signal indicative of the number of revolutions from an alternating current signal generated by the electric power generator, the electric power generator can also have a capability of detecting the number of revolutions. By way of example, if the use is made of a wave shaping process for shaping the waveform of a portion of the output from the electric power generator to provide a train of pulses proportional to the number of revolutions, the number of revolutions can be detected. Thus, no separate rotation sensor is needed in the practice of the present invention, making it possible to integrate the support bearing and the electric power generator together to have not only the capability of generating the electric power, but also the capability of detecting the number of revolutions with the space for installation of the bearing assembly being consequently advantageously reduced.

In one preferred embodiment of the present invention, the electric power generator referred to above includes a rotor in the form of a ring-shaped multi-pole magnet mounted on the rotatable raceway member and magnetized to have a plurality of opposite magnetic poles in a direction circumferentially thereof, and a stator including a ring member made of a magnetic member mounted on the non-rotatable raceway member in alignment with the rotor and also an electric coil accommodated in the ring member.

With the electric power generator utilizing such a multi-pole magnet, it is possible and easy to multi-magnetize the electric power generator and to compactize the electric power generator and, yet, the electric power generator can provide an efficient generation of the electric power. In particular, where the electric power generator is concurrently used as a device for detecting the number of revolutions, the number of revolutions can be efficiently and accurately accomplished due to multi-polarization available from the multi-pole magnet.

In one preferred embodiment, where the electric power generator makes use of the multi-pole magnet for its rotor, the ring member of the stator may be of a structure in which a portion of the ring member confronting the rotor is formed with two groups of comb-shaped claws extending in respective directions opposed to each other such that the claws are interleaved with each other and juxtaposed relative to each other in a direction circumferentially of the ring member with a gap defined between the neighboring claws of those groups and with each of the claws of those groups defining a corresponding magnetic pole.

The bearing assembly provided in accordance with the present invention is preferably a radial type bearing assembly and may include sealing members for sealing opposite annular open ends of an annular working space delimited between the non-rotatable and rotatable raceway members. These sealing members may be positioned at respective locations axially outwardly of a group of rolling elements, rollingly interposed between the non-rotatable and rotatable raceway members, and the electric power generator.

According to this feature, disposition of the sealing members on respective sides of the group of the rolling elements and the electric power generator that are arranged in a direction axially of the bearing assembly is effective to seal raceways, defined in the non-rotatable and rotatable raceway members, and the electric power generator accommodated within the annular working space delimited between the non-rotatable and rotatable raceway members. For this reason, no separate sealing member is needed for each of the raceways and the electric power generator and, hence, a sufficient sealability can be obtained without the number of component parts increased unduly.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

A bearing assembly having an electric power generating capability in accordance with a first preferred embodiment of the present invention will now be described with reference to FIGS. 1 to 5. The bearing assembly A shown therein is in the form of a rolling bearing 1 having an electric power generator 2 built therein. The rolling bearing 1 is of a radial type and includes an inner race 6 defining a rotatable raceway member; an outer race 7 similarly defining a non-rotatable raceway member and positioned radially outwardly of the inner race 6 to define an annular working space between the inner and outer races 6 and 7; and a circular row of rolling elements 8 rollingly interposed between the inner and outer races 6 and 7. The inner and outer races 6 and 7 have their respective outer and inner peripheral surfaces formed with circumferentially extending inner and outer raceways 6a and 7a, and the rolling elements 8 operatively retained by a retainer or cage 9 in a circumferential row are accommodated within the annular working space, having been received in part in the inner raceway 6a and in part in the outer raceway 7a. The rolling element 8 may be in the form of a ball.

Figure 1:
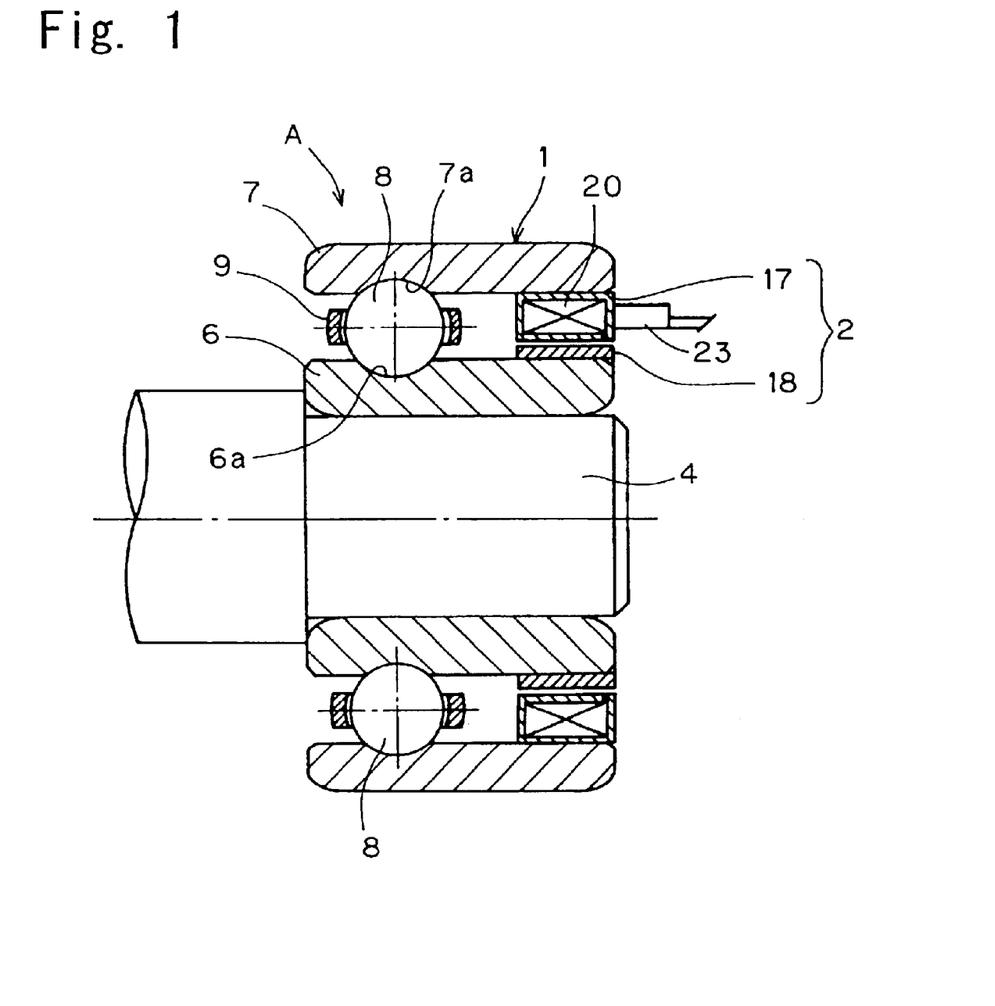
FIG. 1 is a longitudinal sectional view showing a bearing assembly having an electric power generating capability according to a first preferred embodiment of the present invention.

The electric generator 2 referred to above includes a rotor 18 fixedly mounted on the outer peripheral surface of the inner race 6 and a stator 17 fixedly mounted on the inner peripheral surface of the outer race 7 in face-to-face relation with the rotor 18. The respective raceways 6a and 7a are biased towards one end of the annular working space remote from the electric power generator 2 to be positioned on one side of a point intermediate of the axial length of the bearing assembly remote from the electric power generator 2. In other words, the electric power generator 2 and the raceways 6a and 7a are positioned on respective sides of the point intermediate of the axial length of the bearing assembly A.

Figure 2A:
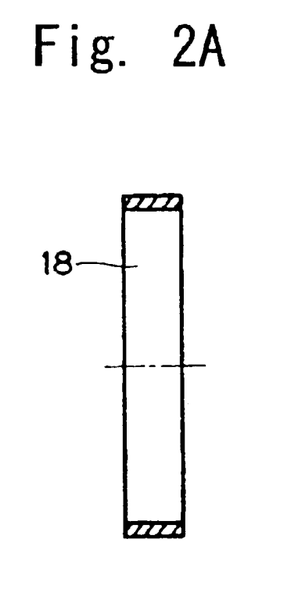
FIGS. 2A and 2B are fragmentary longitudinal sectional and front elevational views of a generator rotor employed in the bearing assembly shown in FIG. 1, respectively.
Figure 2B:
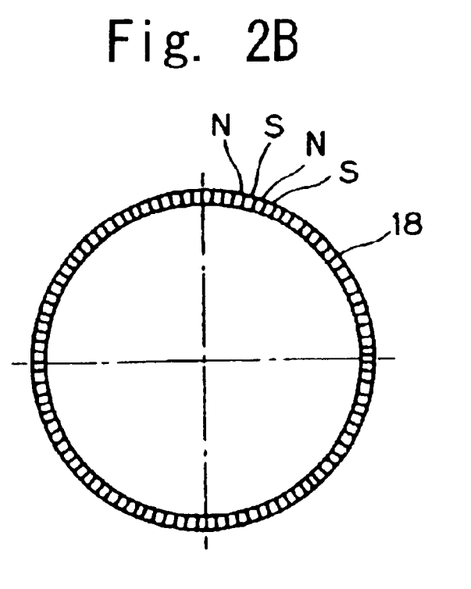

As best shown in FIGS. 2A and 2B, the generator rotor 18 is in the form of a ring-shaped member made up of a multi-pole magnet having a plurality of circumferentially equally spaced, opposite magnetic poles N and S alternating one after another in the circumferential direction. Specifically, this generator rotor 18 may be constructed of a core metal having a multi-pole magnet member fixed on an outer periphery of the core metal, which multi-pole magnet member may be made up of a rubber magnet, a plastic magnet, a sintered alloy or the like. Where the plastic magnet or the sintered alloy is employed, the use of the core metal can be dispensed with. This generator rotor 18 can be mounted on the outer periphery of the inner race 6 and fixed in position by the use of a bonding material or under interference fit.

Figures 3A, 3B:
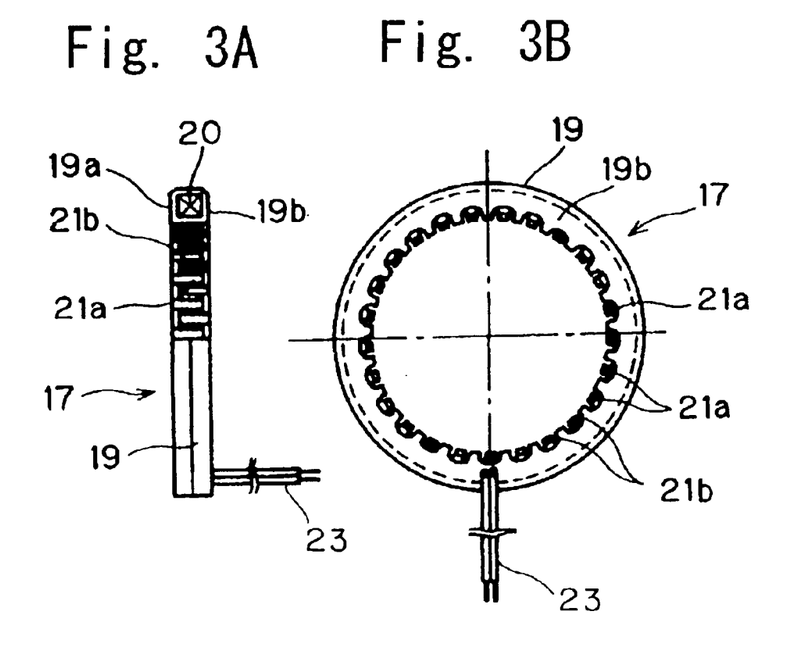
FIGS. 3A and 3B are fragmentary longitudinal sectional and front elevational views of a generator stator employed in the bearing assembly shown in FIG. 1, respectively.

As shown in FIGS. 3A and 3B, the generator stator 17 is of a claw-pole type. More specifically, the generator stator 17 includes a generally tubular ring member 19 made of a magnetic material and having a generally rectangular-sectioned hollow as described subsequently and an electric coil 20 accommodated within the hollow of the ring member 19 with lead lines 23 of the coil 20 drawn outwardly from the ring member 19. The ring member 19 is of a generally U-shaped sectional configuration opening radially inwardly having first and second opposite annular end walls and an outer peripheral wall bridging between respective outer edges of the first and second annular end walls. Respective inner edges of the first and second annular end walls 19a and 19b of the ring member 19 are formed with corresponding groups of claws 21a and 21b that are interleaved with each other. Each of the groups of the claws 21a and 21b may be formed by shaping the corresponding inner edge of the first or second end wall 19a or 19b of the ring member 19 to represent a plurality of circumferentially equally spaced claws which are subsequently bent to extend axially inwardly of the ring member 19 towards the opposite inner edge of the second or first end wall 19a or 19b of the ring member 19. The claws 21a integral with the first end wall 19a of the ring member 19 and the claws 21b integral with the second end wall 19b of the bring member 19 are interleaved with each other so as to alternate one after another in the circumferential direction of the ring member 19 with a gap defined between the neighboring claws 21a and 21b.

Figure 5:
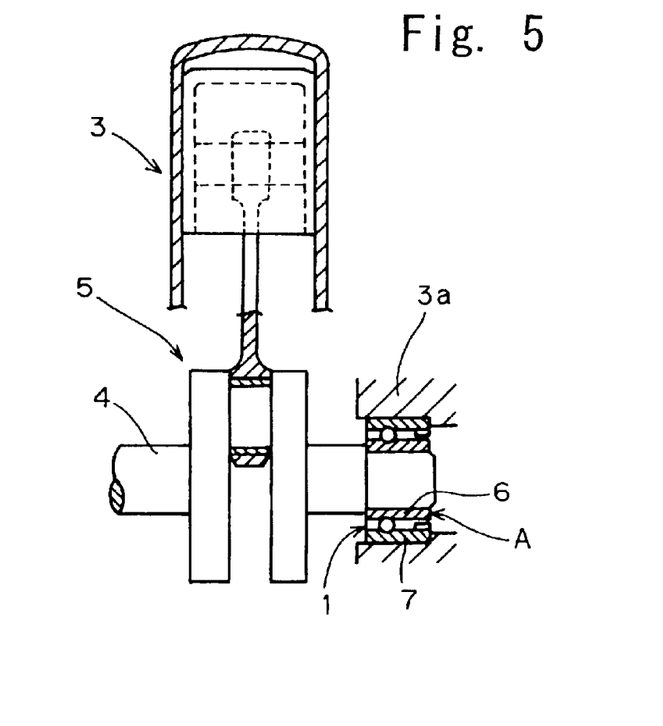
FIG. 5 is a schematic longitudinal sectional view showing a drive transmission system of an internal combustion engine in which the bearing assembly of the present invention is installed.

As shown in FIG. 5, the bearing assembly A of the structure described above and having the electric power generating capability is utilized somewhere in the drive transmission 5 of an internal combustion engine 3, for example, for supporting a crankshaft 4. In such case, the outer race 7 of the rolling bearing 1 is firmly secured to a casing 3a and the crankshaft 4 is press-fitted into the inner race 6 for rotation together therewith. The internal combustion engine 3 referred to above may be a general-purpose internal combustion engine such as employed in a lawn mower, harvester or cropper. Alternatively, the internal combustion engine 3 may be the one used in an automotive vehicle.

Figure 4:
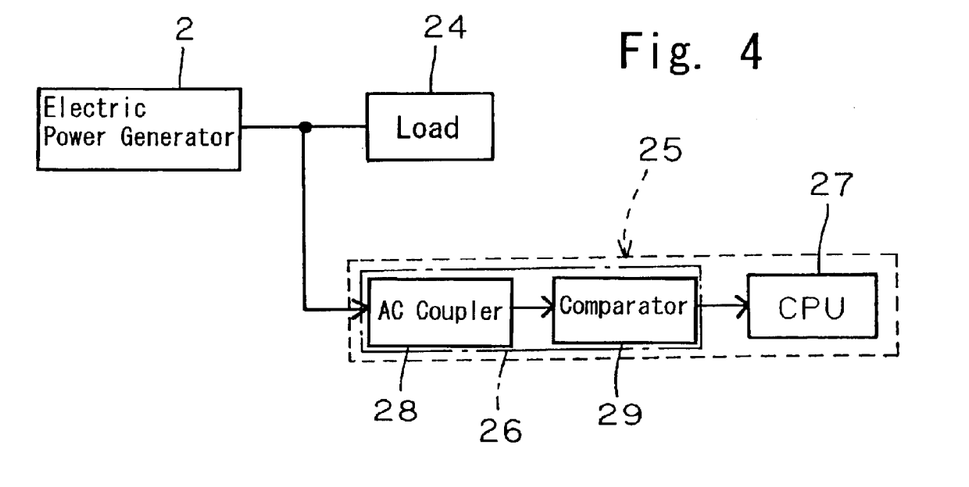
FIG. 4 is a circuit block diagram showing an electric connection between the electric power generator, a load and a signal processing circuit for processing a signal component indicative of the number of revolutions.

Referring to FIG. 4, the electric power generator 2 has an output terminal electrically connected with a load 24 and a processing circuit 26 for processing rotation signal components. The rotation signal component processing circuit 26 may be a wave shaping circuit and includes an AC coupler 28 and a comparator 29. A current generated by the electric power generator 2 is supplied in part to the load 24 and also in part to the rotation signal processing circuit 26 from which a rotation signal indicative of the number of revolutions can be outputted in the form of a train of pulses proportional to the number. This rotation signal is supplied to a control circuit 27 such as CPU (Central Processing Unit), or the like. Thus, it will readily be seen that the electric power generator 2 concurrently serves not only as an electric power generator, but also as a rotation detector.

The rotation signal processing circuit 26 may be disposed inside the rolling bearing 1 or may be disposed outside the rolling bearing 1. Where the rotation signal processing circuit 26 is disposed inside the rolling bearing 1, it may be disposed within the ring member 19 defining the generator stator 17 or may be disposed outside the stator 17. On the other hand where the rotation signal processing circuit 26 is disposed outside the rolling bearing 1, it may be incorporated as a component part of a control device 25 having a control circuit 27 comprised of, for example, a central processing unit or the like. It is to be noted that the control circuit 27 is operable to control the internal combustion engine 3 in dependence on the rotational speed. It is also to be noted that in relation to the electric power generator 2, a secondary cell and a charging circuit (both not shown) may be employed for accumulating the electric power generated by the electric power generator 2.

The bearing assembly A having the electric power generating capability as hereinabove discussed operates in the following manner. Assuming that the rotor 18 in the form of the multi-pole magnet rotates together with the inner race 6 serving as the rotatable raceway member, an electric induction current is induced in the coil 20 of the stator 17 as a result of change in polarity, thereby generating an electric power therefrom. A portion of the current so generated from the stator 17 is inputted to the rotation signal processing circuit 26 (FIG. 2) comprised of, for example, the wave shaping circuit, with the consequence that a train of pulses can be generated from the signal processing circuit 26 as the rotation signal indicative of the number of revolutions of the rotor 18.

As described above, the bearing assembly A having the electric power generating capability may be a version in which the support bearing for the support of the crankshaft 4, the electric generator and the rotation sensor are integrated together. Accordingly, as compared with the separate use of the electric power generator and the rotation detector independently, the assemblability can be increased advantageously. Also, since the electric power generator 2 is built in the bearing 1, the structure as a whole can be compact.

The load 24 shown in FIG. 4 utilizing the electric power generated by the electric power generator 2 may be one or more of various indicator elements such as indicator lamps accessory to the internal combustion engine 3 and a handheld lamp. The rotation signal available from the electric power generator 2 through the rotation signal processing circuit 26 can be used in the control circuit 27 for detecting, for example, an abnormal condition of the internal combustion engine 3 such as abnormality in number of revolutions. If in the event of an abnormality occurring in the number of revolutions, a control may be carried out with the control circuit 27 to reduce the number of revolutions to thereby avoid any possible damage such as burnout of the coil 20 of the electric power generator 2.

Considering that the electric power generator 2 includes the rotor 18 in the form of the multi-pole magnet and the stator 17 having the interleaved groups of the claws 21a and 21b, multi-polarization and compactization can easily be achieved and an efficient generation of the electric power with maximized use of magnetic fluxes available can be accomplished advantageously. Also, due to multi-polarization, a highly accurate detection of the number of revolutions is possible.

Figure 6:
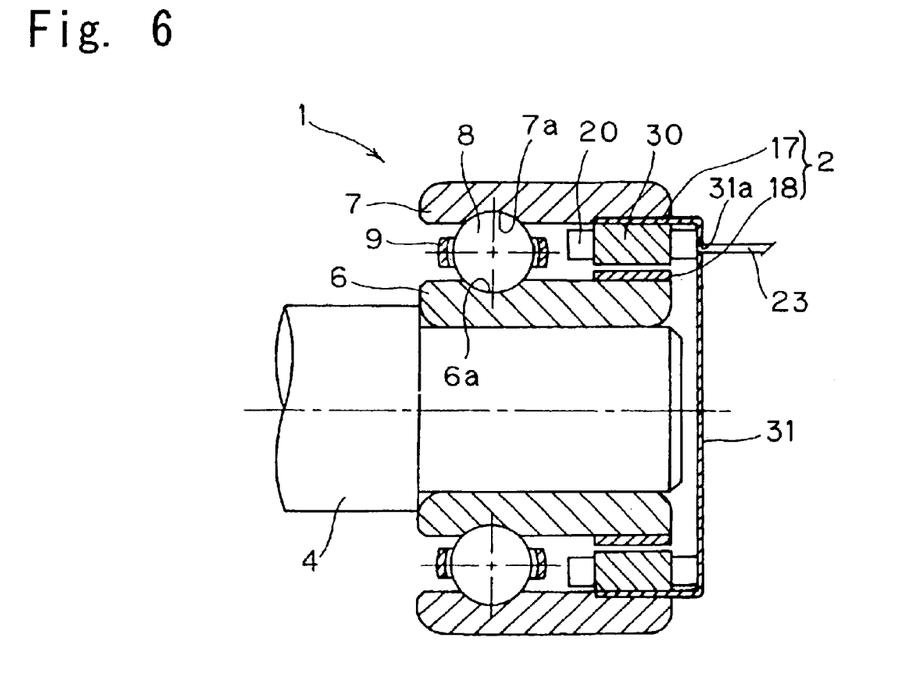
FIG. 6 is a longitudinal sectional view of the bearing assembly according to a second preferred embodiment of the present invention.

FIG. 6 illustrates a second preferred embodiment of the present invention. The bearing assembly according to this embodiment is similar to that according to the previously described embodiment, except that in place of the claw-pole type, the stator 17 of the electric power generator 2 shown in FIG. 6 is made up of a laminated silicon steel plate 30 with the coil 20 wound therearound. Also, one of the opposite open ends of the annular working space adjacent the electric power generator 2 in the rolling bearing 1 shown in FIG. 6 is covered by a cover 31 that is fitted into the bore of the outer race 7. The lead lines 23 drawn outwardly from the generator stator 17 are drawn out of the rolling bearing 1 through a lead-out hole 31a defined in the cover 31. Other structural features of the bearing assembly shown in FIG. 6 are similar to those shown and described in connection with the first embodiment and, therefore, the details thereof are not reiterated for the sake of brevity.

Figure 7:
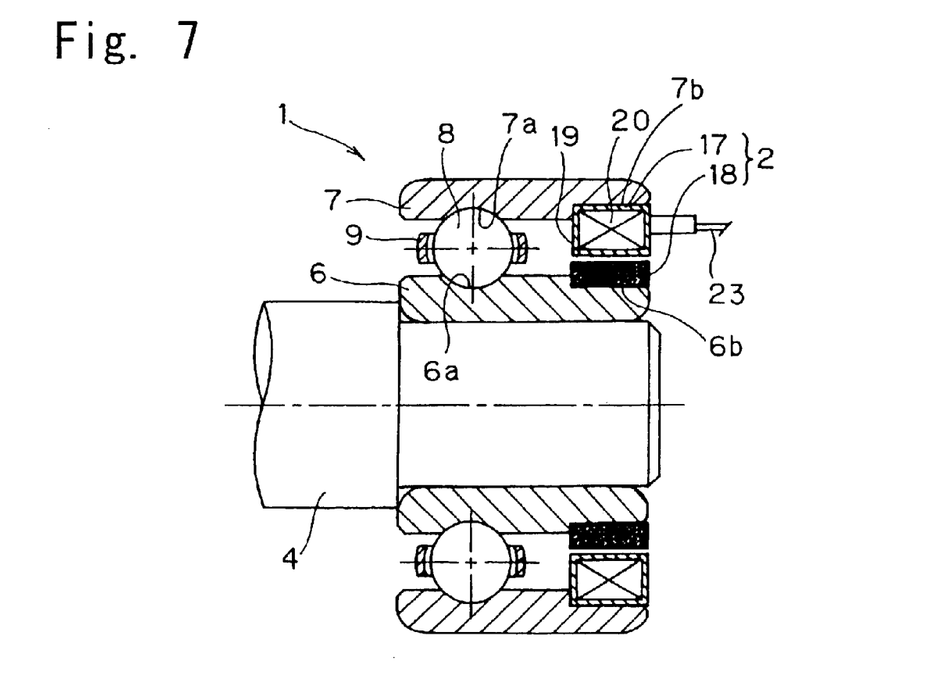
FIG. 7 is a longitudinal sectional view of the bearing assembly according to a third preferred embodiment of the present invention.

A third preferred embodiment of the present invention is shown in FIG. 7. The bearing assembly shown in FIG. 7 is substantially similar to that according to the first embodiment, except that in the embodiment shown in FIG. 7 an outer peripheral surface portion of the inner race 6 adjacent the electric power generator 2 is radially inwardly depressed to provide a reduced diameter portion 6b on which the generator rotor 18 is fixedly mounted and, similarly, an inner peripheral surface portion of the outer race 7 adjacent the electric power generator 2 is radially outwardly depressed to provide a large diameter portion 7b in which the generator stator 17 is press-fitted. As a matter of course, the reduced diameter portion 6b has an outer diameter smaller than that of the remaining portion of the inner race 6 and the large diameter portion 7b has an inner diameter greater than that of the remaining portion of the outer race 7.

According to the embodiment shown and described with reference to FIG. 7, the presence of the reduced and large diameter portions 6b and 7b in the inner and outer races 6 and 7, respectively, does in effect increase the size of the annular working space between the inner and outer races 6 and 7, where the electric power generator 2 is accommodated, thus the generator rotor 18 can have the magnet of an increased thickness and the stator coil 20 can have an increased number of turns, so that the amount of the electric power generated by the electric power generator 2 can advantageously be increased. Other structural features of the bearing assembly shown in FIG. 7 are similar to those shown and described in connection with the first embodiment and, therefore, the details thereof are not reiterated for the sake of brevity.

Figure 8:
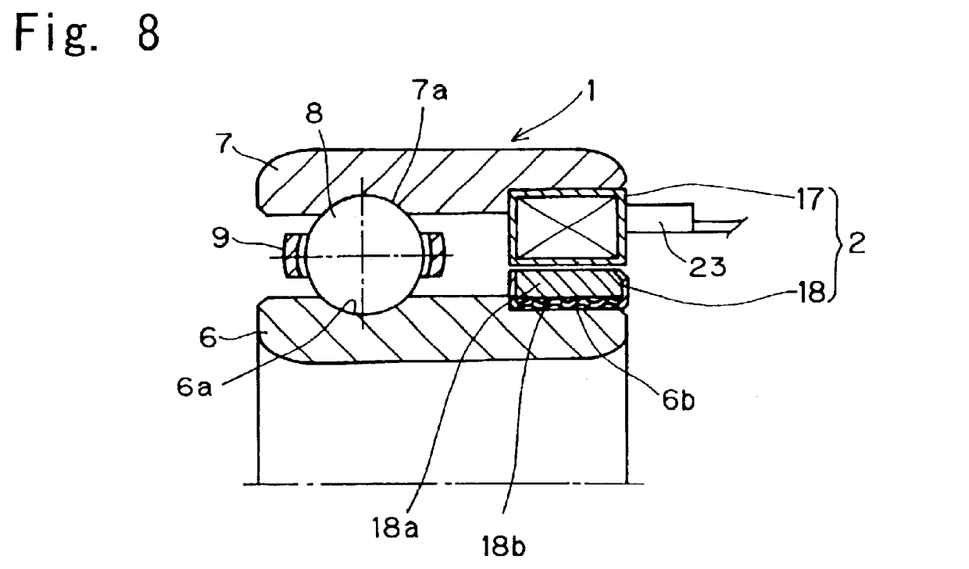
FIG. 8 is a longitudinal sectional view of the bearing assembly according to a fourth preferred embodiment of the present invention.

The bearing assembly according to a fourth preferred embodiment of the present invention is shown in FIG. 8. The bearing assembly shown in FIG. 8 is substantially similar to that according to the third embodiment shown in FIG. 7, except that in the embodiment shown in FIG. 8, as a structural element for fixing the multi-pole magnetized rotor 18 to the inner race 6, a corrugated core metal 18b is employed and mounted on the reduced diameter portion 6b of the inner race 6. The ring-shaped generator rotor 18 employed therein is of a type including a core metal 18b of a metallic plate having a multi-pole magnet member 18a mounted fixedly on an outer periphery of the core metal 18b. The magnet member 18a may be made up of a rubber magnet, a plastic magnet, a sintered alloy or the like. This core metal 18b is of a generally U-sectioned design opening radially outwardly, including opposite end walls and a peripheral wall bridging between the end walls, with the peripheral wall being corrugated in a direction conforming to the axial direction of the generator rotor 18. This core metal 18b is mounted on the reduced diameter portion 6b of the inner race 6 under interference fit with the corrugated peripheral wall thereof held in contact with the inner race 6.

It is to be noted that if desired, the core metal 18 may be of a design including only the peripheral wall or of a design having only one end wall lying perpendicular to the peripheral wall.

According to the embodiment shown in FIG. 8, fixing of the rotor 18 on the inner race 6 through the corrugated core metal 18b is effective in that any possible thermal expansion difference between the generator rotor 18 and the inner race 6 which would result from change in temperature can advantageously be compensated for by the corrugation of the metal core 18b. Considering that a high temperature tends to evolve in the drive transmission system of the internal combustion engine during the operation of the latter, and a relatively large temperature difference occurs depending on the status of the internal combustion engine, that is, whether the internal combustion engine is operated or halted, the corrugated feature of the core metal 18b is indeed effective to absorb a difference in thermal expansion between the generator rotor 18 and the inner race 6, to thereby avoid any undesirable loosening of the generator rotor 18 from the inner race 6. In view of this, any press-fitting technique that provides a simple fixing structure even under a high temperature environment can be employed for mounting the rotor 18.

Figure 9:
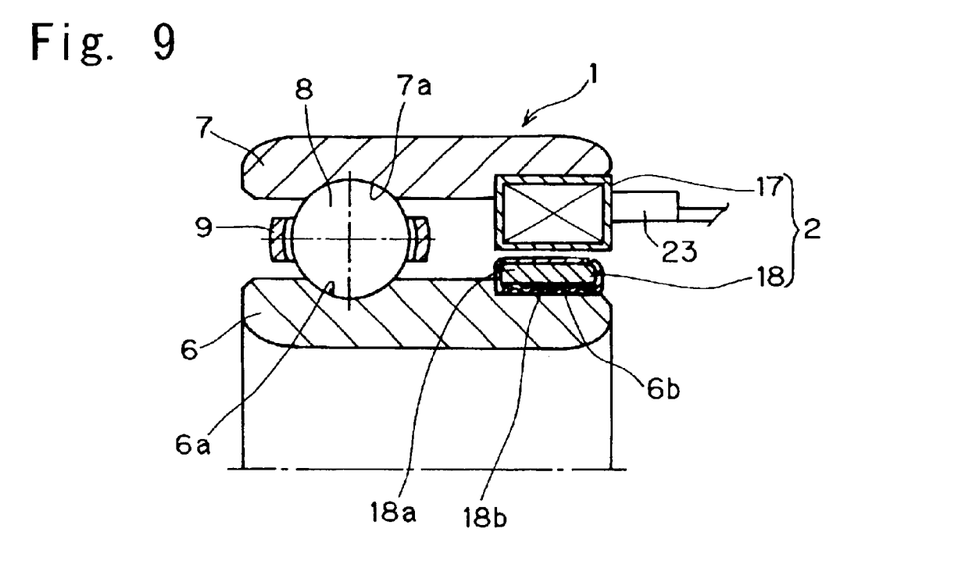
FIG. 9 is a longitudinal sectional view of the bearing assembly showing a modified form of the embodiment shown in FIG. 8.

FIG. 9 illustrates a modification of the fourth embodiment shown in and described with reference to FIG. 8. Specifically, if the core metal 18b is modified to represent a generally tubular ring encompassing the magnet member 18a substantially in its entirety as shown in FIG. 9, the modified core metal 18b concurrently serves as a covering for the magnet member 18a. Accordingly, even though the magnet member 18a is made of a material, such as a rubber magnet, plastic magnet or the like, susceptible to scratch as a result of collision with foreign matter such as stones or rocks, the modified core metal 18b is advantageously effective to avoid any possible damage to the surface of the magnet member 18a. In this modification, the core metal 18b is preferably made of a non-magnetic material.

It is to be noted that although in the embodiment and its modification shown respectively in FIGS. 8 and 9, the inner race 6 has been shown and described as formed with the reduced diameter portion 6b, such reduced diameter portion 6b is not necessarily required provided that a sufficient space for accommodating the electric power generator 2. Also, this can be equally applied to the large diameter portion defined in the outer race 7 if a sufficient space for accommodating the generator stator 17 is available.

Figure 10:
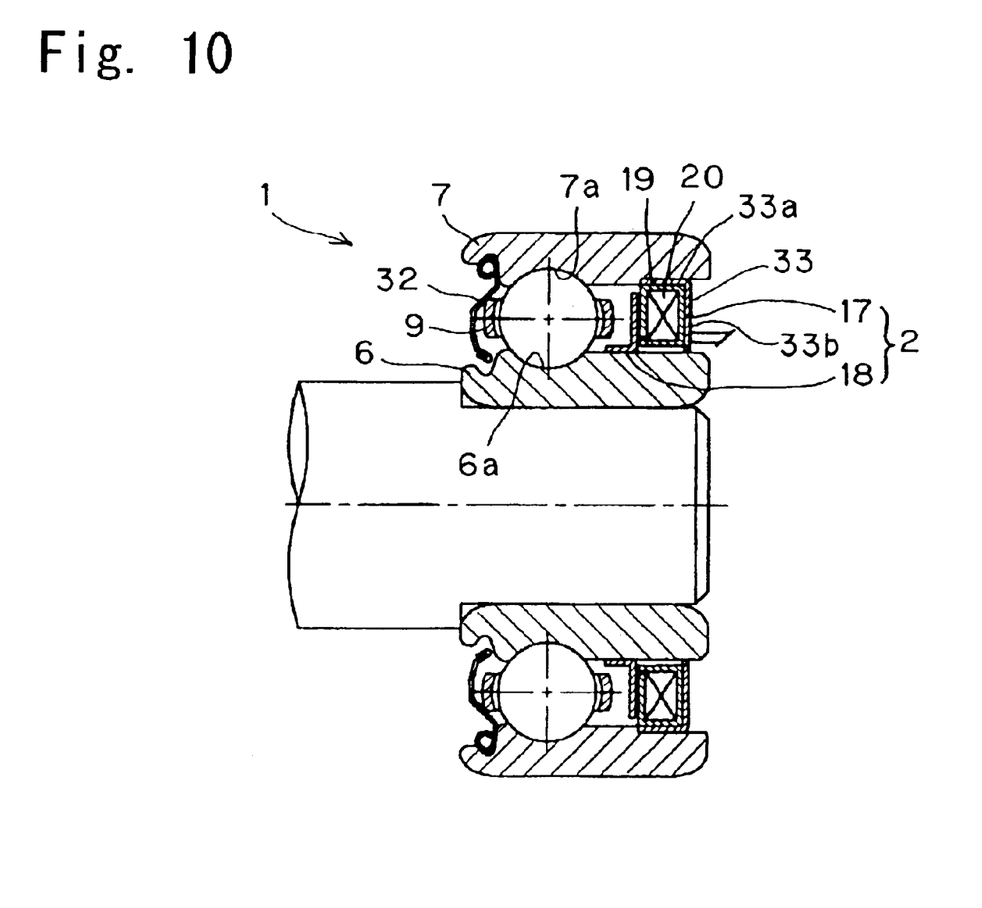
FIG. 10 is a longitudinal sectional view of the bearing assembly according to a fifth preferred embodiment of the present invention.

The bearing assembly according to a fifth preferred embodiment of the present invention is shown in FIG. 10. The bearing assembly shown in FIG. 10 is substantially similar to that according to the first embodiment shown in FIGS. 1 to 5, except that an axial type electric power generator is employed for the electric power generator 2. The electric power generator 2 includes the generator rotor 18 of a generally L-sectioned ring member having an end wall and a peripheral wall perpendicular to that end wall, wherein the end wall has an annular end face magnetized to define a plurality of circumferentially equally spaced, opposite magnetic poles alternating one after another in the circumferential direction thereof. The generator stator 17 employed in this axial type electric power generator 2 is positioned in side-by-side fashion to the generator rotor 18. Although the generator stator 17 employed in this fifth embodiment is of the claw-pole type, the generator stator 17 is so positioned as to permit its comb-shaped claws to confront the magnetized annular surface of the generator rotor 18.

Also, in this embodiment, the sealing members 32 and 33 for sealing the opposite open ends of the annular working space delimited between the inner and outer races 6 and 7 are employed. The sealing steel 33 used to seal the open end of the annular working space adjacent the electric power generator 2 is of a generally inverted L-sectioned ring member so extending as to cover from the outer peripheral surface to the outer annular surface of the stator 17. This sealing steel 33 is positioned with the cylindrical body 33a press-fitted in the outer race 7 while with the radial flange 33b extending radially inwardly to terminate at a location slightly spaced from the outer periphery of the inner race 6 to define a non-contact seal.

According to the fifth embodiment, since the sealing members 32 and 33 are positioned on respective sides of the rolling elements 8 and the electric power generator 2, any possible ingress of foreign matter from outside into the annular working space, specifically the inner and outer raceways 6a and 7a and the electric power generator 2 can effectively be barred by the sealing members 32 and 33. Other structural features, and effects brought about thereby, of the bearing assembly shown in FIG. 10 are similar to those shown and described in connection with the first embodiment and, therefore, the details thereof are not reiterated for the sake of brevity.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, although in describing any one of the foregoing embodiments of the present invention, the generator rotor 18 and the generator stator 17 have been shown and described as mounted on the inner race 6 and the outer race 7, respectively, the generator rotor 18 and the generator stator 17 may be mounted on the outer race 7 and the inner race 6, respectively. In such case, the outer race 7 is to be used as the rotatable raceway member.

Accordingly, such changes and modifications are, unless they depart from the scope of the present invention as delivered from the claims annexed hereto, to be construed as included therein.

What is claimed is:

1. A bearing assembly having an electric power generating capability, for an internal combustion engine having a drive transmission system, the bearing assembly comprising:
   a rolling bearing disposed in the drive transmission system and including a non-rotatable raceway member and a rotatable raceway member rotatable relative to the non-rotatable raceway member;
   rolling elements, rollingly interposed between the non-rotatable and rotatable raceway members; and
   an electric power generator, interposed between the non-rotatable and rotatable raceway members, generating an electric power by a rotation of the rotatable raceway member relative to the non-rotatable raceway member, the electric generator being positioned at respective side portions of the non-rotatable and rotatable raceway members, to facilitate access thereto,
   wherein the rolling elements and the electric power generator are disposed on opposite sides of a point bisecting an axial length of the bearing assembly.

2. The bearing assembly as claimed in claim 1, wherein:
   the internal combustion engine comprises a crankshaft; and
   the bearing assembly supports the crankshaft.

3. The bearing assembly as claimed in claim 1, wherein the electric power generator concurrently detects a number of revolutions and generates the electric power.

4. The bearing assembly as claimed in claim 1, wherein the electric power generator comprises:
   a rotor having a ring-shaped multi-pole magnet mounted on the rotatable raceway member and magnetized to have a plurality of opposite magnetic poles in a direction circumferentially thereof; and
   a stator having a ring member made of a magnetic member mounted on the non-rotatable raceway member in alignment with the rotor, and having an electric coil accommodated in the ring member.

5. The bearing assembly as claimed in claim 4, wherein the ring member of the stator has a portion confronting the rotor, which portion is formed with two groups of comb-shaped claws extending in respective directions opposed to each other such that the claws are interleaved with each other and juxtaposed relative to each other in a direction circumferentially of the ring member with a gap defined between the neighboring claws of those groups.

6. The bearing assembly as claimed in claim 1, wherein the bearing assembly is a radial type bearing assembly and further comprises a pair of sealing members sealing opposite annular open ends of an annular working space delimited between the non-rotatable and rotatable raceway members, said sealing members being positioned at respective locations axially outwardly of the electric power generator and rolling elements, which are rollingly interposed between the non-rotatable and rotatable raceway members.

7. A bearing assembly for an internal combustion engine having a drive transmission system, the bearing assembly comprising:
   a rolling bearings, disposed in the drive transmission system, and having a first raceway member and a second raceway member rotatable relative to the first raceway member;
   rolling elements, rollingly interposed between the first and second raceway members at a first portion of the rolling bearing; and
   a generator, interposed between the first and second raceway members at a second portion of the rolling bearing, opposite to the first portion relative to a midpoint of an axial length of the bearing assembly, to facilitate access thereto, and generating electric power by rotation of the second raceway member.

* * * * *

UNITED STATES PATENT AND TRADEMARK OFFICE
CERTIFICATE OF CORRECTION

PATENT NO. : 6,838,794 B2
DATED : January 4, 2005
INVENTOR(S) : Kenichi Iwamoto et al.

It is certified that error appears in the above-identified patent and that said Letters Patent is hereby corrected as shown below:

<u>Column 10,</u>
Line 23, change "bearings" to -- bearing --.

Signed and Sealed this

Sixteenth Day of August, 2005

JON W. DUDAS
*Director of the United States Patent and Trademark Office*